Feb. 4, 1964 E. H. HAHN 3,120,244
CONTROL VALVE UNIT
Filed May 5, 1961 2 Sheets-Sheet 1
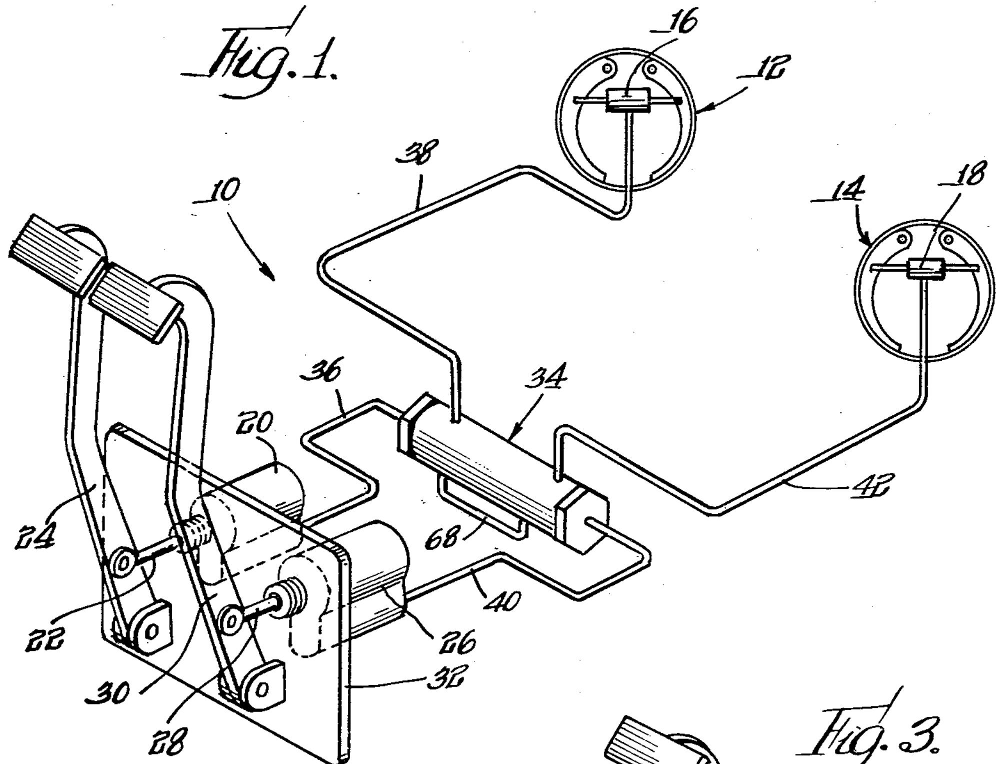
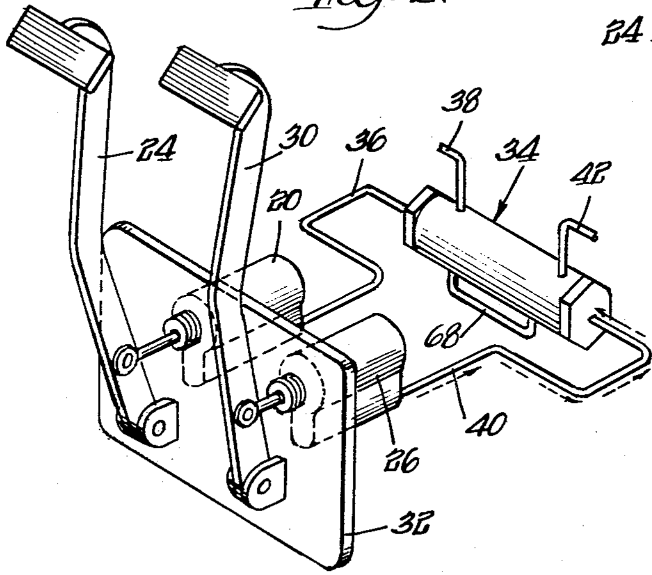
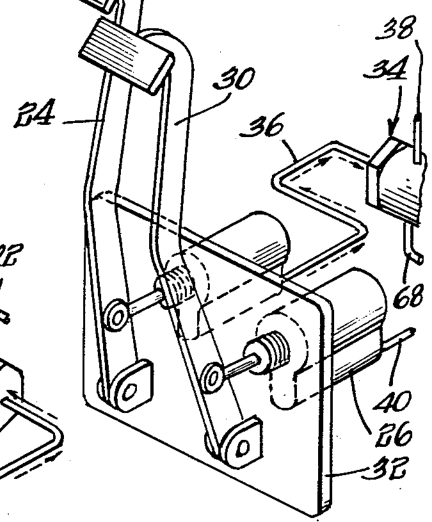
INVENTOR.
Emil H. Hahn
BY:
Olson, Trexler
Wolters & Bushnell attys.

CONTROL VALVE UNIT
Filed May 5, 1961 2 Sheets-Sheet 2
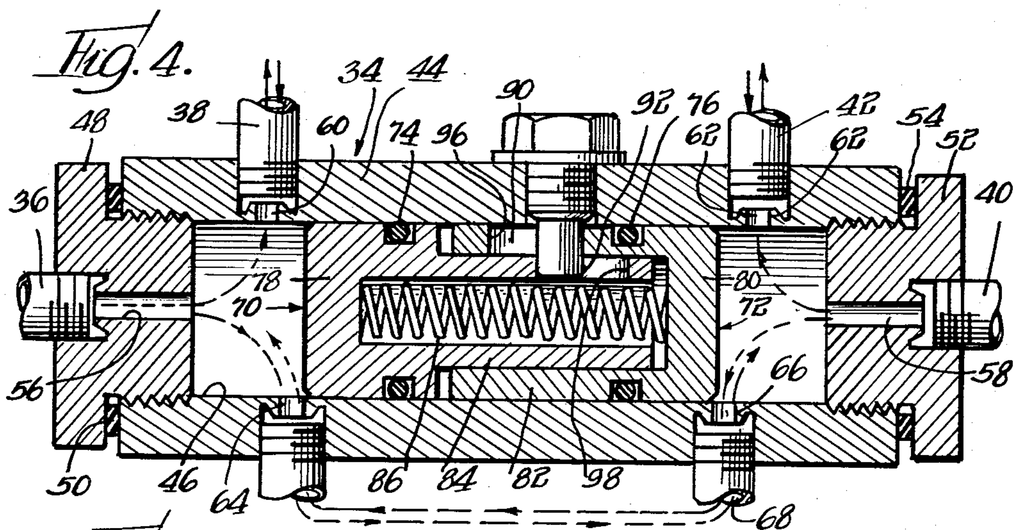
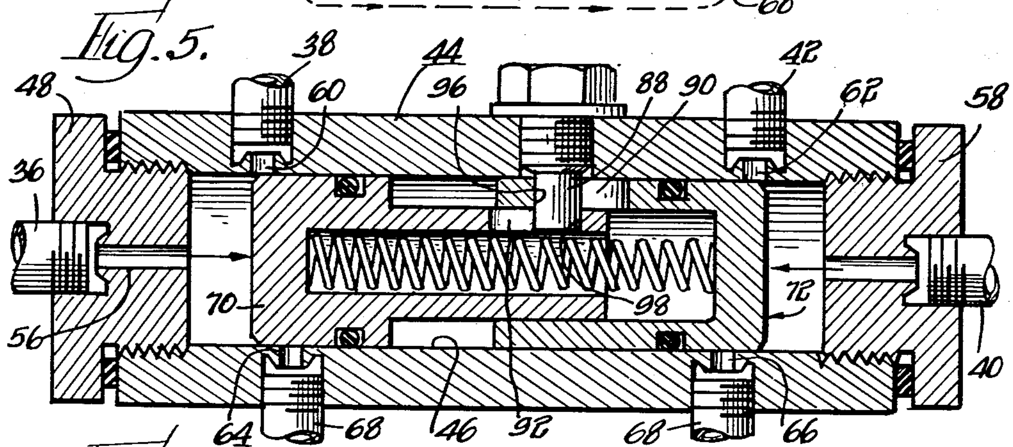
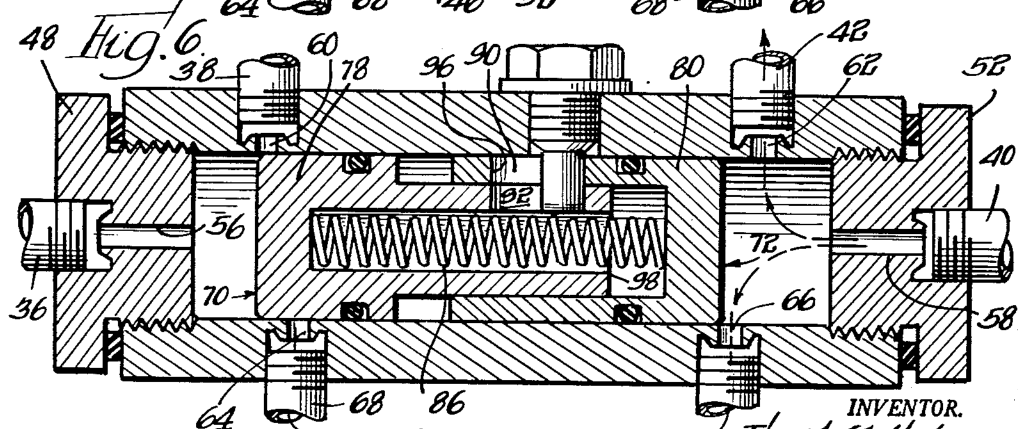
INVENTOR.
Emil H. Hahn
BY
Olson, Trexler, Wolters & Bushnell Attys.

3,120,244
Patented Feb. 4, 1964

3,120,244

CONTROL VALVE UNIT

Emil H. Hahn, St. Joseph, Mich., assignor, by mesne assignments, to Lambert Brake Corporation, St. Joseph, Mich., a corporation of Michigan Filed May 5, 1961, Ser. No. 107,963
4 Claims. (Cl. 137—512.5)

The present invention relates to a novel fluid pressure control apparatus and more specifically to a novel valve structure for use in such apparatus.

It will become apparent that apparatus and valve structures incorporating features of the present invention may be adapted for use in various installations. In order to facilitate the present disclosure, an apparatus or system especially suitable for controlling brake units will be described. In certain vehicles such as tractors, airplanes and the like, it has heretofore been proposed to provide separate fluid operated brake units for each wheel and separate master cylinders for controlling each brake unit. Furthermore, the master cylinders have been provided with separate operating levers or pedals arranged for enabling the master cylinders to be either separately or simultaneously operated for selectively separately or simultaneously energized in the brake units. This arrangement enables the brake system to be used for steering the vehicle by selectively operating the separate brake units as well as for stopping the vehicle.

With heretofore generally available brake systems of the above described type, the operating levers or pedals have usually been constructed and arranged so that they will be moved in unison when it is desired to operate the separate brake units simultaneously. However, it has been found that even when the pedals are moved in unison, an uneven operation of the separate brake units frequently occurs as a result of differences in wear and adjustment between the brake units. Thus, if one brake unit is worn more than another, more movement of its associated master cylinder is required for obtaining a desired braking action and in such a situation it is apparent that equal movement of the brake pedals of the different master cylinders will cause unequal operation of the brakes which in turn may cause undesirable or even dangerous swerving of the vehicle.

It is an important object of the present invention to provide a novel control system of the above described general type which is constructed so that a plurality of means to be controlled may be separately operated and also simultaneously and substantially uniformly energized.

A more specific object of the present invention is to provide a novel valve structure which may be readily incorporated in new or previously existing control systems having dual master cylinders for equalizing the pressure of fluid delivered to separate means to be controlled when the master cylinders are simultaneously operated and for alternatively enabling the master cylinders to be individually operated for separately energizing the means to be controlled.

Other objects and advantages of the present invention will become apparent from the following description and the accompanying drawings wherein:

FIG. 1 is a perspective view showing a brake or control system incorporating features of the present invention;

FIG. 2 is a fragmentary view similar to FIG. 1 but showing the right hand master cylinder actuated;

FIG. 3 is a perspective view similar to FIG. 2 but showing the left hand master cylinder actuated;

FIG. 4 is an enlarged longitudinal partial sectional view of a control valve incorporating features of the present invention and included in the system of FIGS. 1–3; and further showing portions of the valve in positions they assume when the master cylinders are simultaneously operated;

FIG. 5 is a view similar to FIG. 4 but showing portions of the valve structure in positions they occupy when neither master cylinder is operated or, in other words, showing the parts in their normal or retracted positions; and FIG. 6 is a view similar to FIGS. 4 and 5 but showing parts of the valve strucure in positions they occupy when only the right hand master cylinder has been operated.

Referring now more specifically to the drawings wherein like parts are designated by the same nuumerals throughout the various figures, a control or brake system 10 incorporating features of the present invention is shown in FIGS. 1, 2 and 3. While as indicated hereinabove, the system may be adapted for various uses, it is shown for the purpose of illustrating the present invention as including a pair of brake units 12 and 14 of known construction and having operating cylinders 16 and 18 respectively.

The system 10 is provided with a master cylinder 20 of known construction and having a piston rod 22 extending therefrom and connected with an operating lever or foot pedal 24. A similar master cylinder 26 is mounted adjacent the cylinder 20 and includes a piston rod 28 extending therefrom and connected with a foot pedal or actuating lever 30. The master cylinders 20 and 26 are respectively primarily operatively associated and connected with the cylinders 16 and 18 of the brake units 12 and 14, respectively. The master cylinders are preferably mounted in closely adjacent relationship on suitable support means 32 so that the foot pedals 24 and 30 are closely adjacent to each other as shown in FIG. 1 for enabling them to be readily simultaneously operated as well as individually or separately operated.

A valve structure 34 incorporating features of the present invention is connected in the system 10 between the master cylinders and the brake units. Thus, a conduit 36 connects the master cylinder 20 with the valve structure and a conduit 38 connects the valve structure with the operating cylinder 16 of the brake unit 12. Similar conduits 40 and 41 respectively connect the valve structure with the master cylinder 26 and the operating cylinder 18 of the brake unit 14.

Referring now specifically to FIGS. 4, 5 and 6, it is seen that the valve structure 34 comprises an elongated body portion 44 having a centrally disposed axially extending bore 46 therethrough. One end of the bore is closed and sealed by means of a threaded plug 48 and seal ring 50 and an opposite end of the bore is similarly closed and sealed by a threaded plug 52 and a seal ring 54. The plug or end member 48 is suitably connected with a conduit 36 and is provided with a central aperture or port 56 establishing communication between the conduit 36 and the bore 46. The plug or end member 52 is similarly connected with the conduit or tubing 40 and is provided with a central aperture or port 58 extending between the conduit and the bore 46.

The body member 44 is formed with laterally opening ports 60 and 62 respectively adjacent opposite ends thereof. The port 60 communicates with the conduit or tubing 38 and the port 62 communicates with the conduit 42.

Means is included in the valve structure for establishing communication between opposite end portions of the bore 46 for the purpose described below and, in the embodiment shown, this means includes additional ports 64 and 66 in and located toward opposite end portions of the body member 44. The ports 64 and 66 are connected by a suitable passageway means which comprises a conduit or tubing 68.

Oppositely disposed piston like valve elements 70 and 72 are axially slidably disposed within the bore 46. Sealing rings 74 and 76 are disposed in suitable annular grooves formed in the piston like valve elements 70 and 72 respectively for preventing the leakage of fluid past the outer solid end portions 78 and 80 of the valve elements. The valve element 72 includes a tubular portion 82 extending axially from the solid outer end portion 80, which tubular portion axially slidably receives a reduced diameter tubular portion 84 extending from outer solid end portion 78 of the valve element 70.

A compression spring 86 extends through the tubular portion 84 of the valve element 70 and is compressed between the oppositely disposed end portions 78 and 80 of the valve elements for resiliently biasing the valve elements toward their normal or retracted positions shown in FIG. 5. In order to limit axial movement of the valve elements 70 and 72 within the bore 46 and relative to each other, a pin element 88 is connected to and extends radially inwardly from the wall of the body member 44. The pin element 88 projects into elongated slots 90 and 92 respectively formed in the tubular portions 82 and 84 of the valve elements. Thus, an end wall 96 of the slot 90 provides an abutment engageable with the pin 88 for limiting movement of the valve element 72 toward the right and an oppositely facing end wall 98 of the slot 92 is engageable with the pin for limiting movement of the valve element 70 toward the left in the manner shown in FIG. 5. Similarly, opposite ends of each of the slots are respectively engageable with the pin 88 for limiting movement of their associated valve elements in the opposite directions.

When both of the master cylinders 20 and 26 are in a retracted or deenergized condition, the valve elements 70 and 72 will be maintained in their normal or retracted positions shown in FIG. 5 by the spring 86 as indicated above. It is to be noted that the relationship between the locations of the ports 64 and 66, the stop pin 88 and the abutment surfaces 96 and 98 is such that the valve elements 70 and 72 close the ports 64 and 66 respectively when the valve elements are in their normal or retracted positions shown in FIG. 5. In order to operate the control or brake system 10 the levers or foot pedals 24 and 30 are selectively independently or simultaneously depressed. When, for example, the lever 30 is depressed as shown in FIG. 2, the master cylinder 26 functions to deliver fluid under pressure through the conduit 40 and the port 58 and into the right hand end of the valve bore 46. When the master cylinder 26 is operated alone, the fluid under pressure entering the right hand end of the bore 46 overcomes the force of the spring 86 and forces the valve element 72 toward the left as shown in FIG. 6 until further movement of the valve element is arrested by the pin 88. The fluid flows from the right hand end of the bore 46 through the port 62 for energizing the brake unit 14. It is to be noted that the slot 90 is sufficiently long so that the valve element 72 may be shifted by the fluid under pressure for uncovering the port 66 as shown in FIG. 6. However, flow of fluid through this port will be blocked when only the master cylinder 26 is operated since the port 64 will remain closed.

It is to be understood that when the master cylinder 20 rather than the master cylinder 26 is operated alone as indicated in FIG. 3, the operation of the valve unit will be the opposite from that described in the preceding paragraph. However, when both master cylinders are simultaneously operated for energizing both brake units 12 and 14, fluid under pressure is delivered to the opposite ends of the bore 46 so that both of the valve elements 70 and 72 are shifted inwardly from their normal or retracted positions for respectively uncovering the ports 64 and 66 as shown in FIG. 4. With communication thus established between the opposite end portions of the bore 46, a transfer of fluid may take place so that the pressure in the opposite end portions of the bore 46 will be equalized and therefore the brake units 12 and 14 will be substantially uniformly energized. As a specific example of this function it may be assumed that the brake unit 12 is worn more than the unit 14 so that a greater volume of fluid must be delivered to the cylinder 16 in order to enable the unit 12 to generate a braking force equal to that of the unit 14. Under these conditions, when the brake pedals are simultaneously and substantially uniformly depressed, equal volumes of fluid are delivered through the ports 56 and 58 and into the opposite ends of the bore 46 by the master cylinders. However, since a greater volume of fluid is needed for delivery to the brake unit 12, a portion of the fluid delivered through the port 58 will flow from the right hand end of the bore 46 through the passageway means provided by the ports 64 and 66 and the tubing 68 to the left hand end of the bore 46. The amount of fluid thus transferred will be sufficient so as to substantially equalize the pressures in the opposite ends of the bore. A similar transfer of fluid from the left hand end of the bore to the right hand end will occur in the event that the greater volume of fluid is required for energizing the brake unit 14.

While the preferred embodiment of the present invention has been shown and described herein, it is obvious that many structural details may be changed without departing from the spirit and scope of the appended claims.

The invention is claimed as follows:

1. A valve structure comprising means providing a chamber, a first pair of ports communicating with one portion of said chamber and respectively connectable with a source of fluid under pressure and a unit to be operated, a second pair of ports communicating with a second portion of said chamber and respectively connectable with a second source of fluid under pressure and a second unit to be operated, passageway means extending between and having first and second openings at sides of said first and second mentioned portions of said chamber means, said openings being offset axially of said chamber from the ports in their respective chamber means portions, and piston means in said chamber means responsive to fluid pressures in said first and second portions of said chamber means for blocking said openings when said pressures are relatively low, for unblocking said first opening when the pressure in said first portion of the chamber means is relatively high, and for unblocking said second opening when the pressure in said second portion of the chamber means is relatively high.

2. A valve structure, as defined in claim 1, wherein said piston means includes a plurality of piston elements shiftable relative to each other selectively for singularly and simultaneously unblocking said openings.

3. A valve structure comprising body means having bore means therein of substantially uniform diameter throughout its length, a first pair of ports communicating with one end portion of said bore means and respectively connectable with a source of fluid under pressure and a unit to be operated, a second pair of ports in said body means communicating with an opposite end portion of said bore means and respectively connectable with a second source of fluid under pressure and a second unit to be operated, passageway means between the opposite end portions of said bore means and having first and second openings into sides of said opposite end portions, a pair of resiliently biased piston like valve elements slidably disposed in said bore means respectively for blocking said first and second openings when fluid pressure in said opposite end portions of the bore means is relatively low and for unblocking said openings when the fluid pressure in said opposite end portions of the bore means is raised, one of said piston elements including an elongated reduced diameter portion, the other said piston elements including a tubular sleeve portion slidably receiving said reduced diameter portion, spring means disposed between said valve elements for yieldably biasing said valve elements away from each other, and stop means engageable with said reduced diameter and sleeve portions for limiting movement of said valve elements away from each other.

4. A valve structure, as defined in claim 3, which includes stop means for limiting movement of said valve elements toward each other.

References Cited in the file of this patent

UNITED STATES PATENTS

| | | |
|---|---|---|
| 2,065,044 | Bowen | Dec. 22, 1936 |
| 2,074,361 | Bowen | Mar. 23, 1937 |
| 2,438,973 | Johnson | Apr. 6, 1948 |
| 2,960,102 | Margida | Nov. 15, 1960 |